V. S. DURBIN.
SWIVEL COUPLING FOR PIPE LINES.
APPLICATION FILED JUNE 17, 1916.
1,228,541.
Patented June 5, 1917.
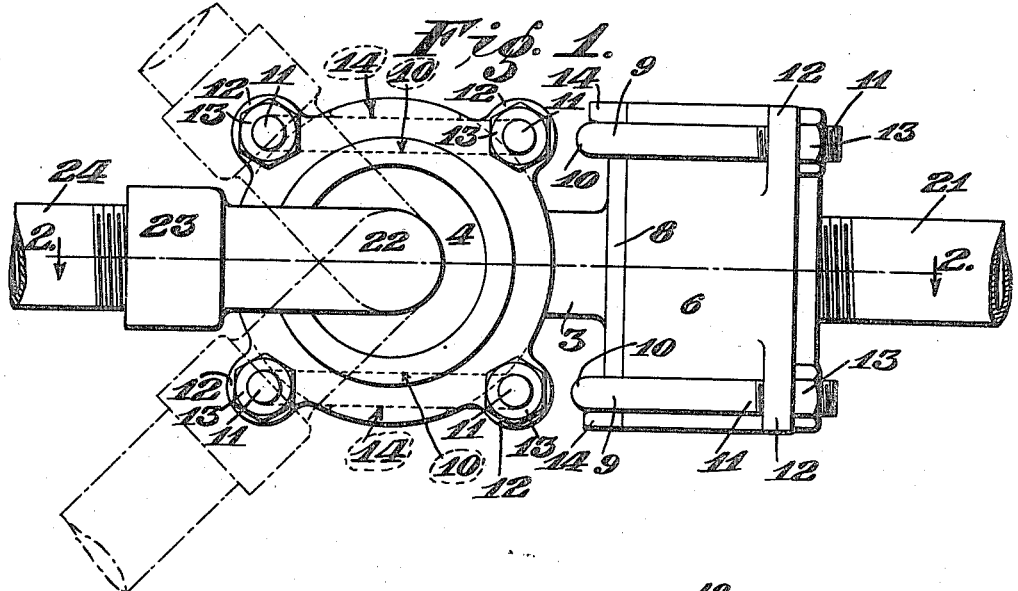
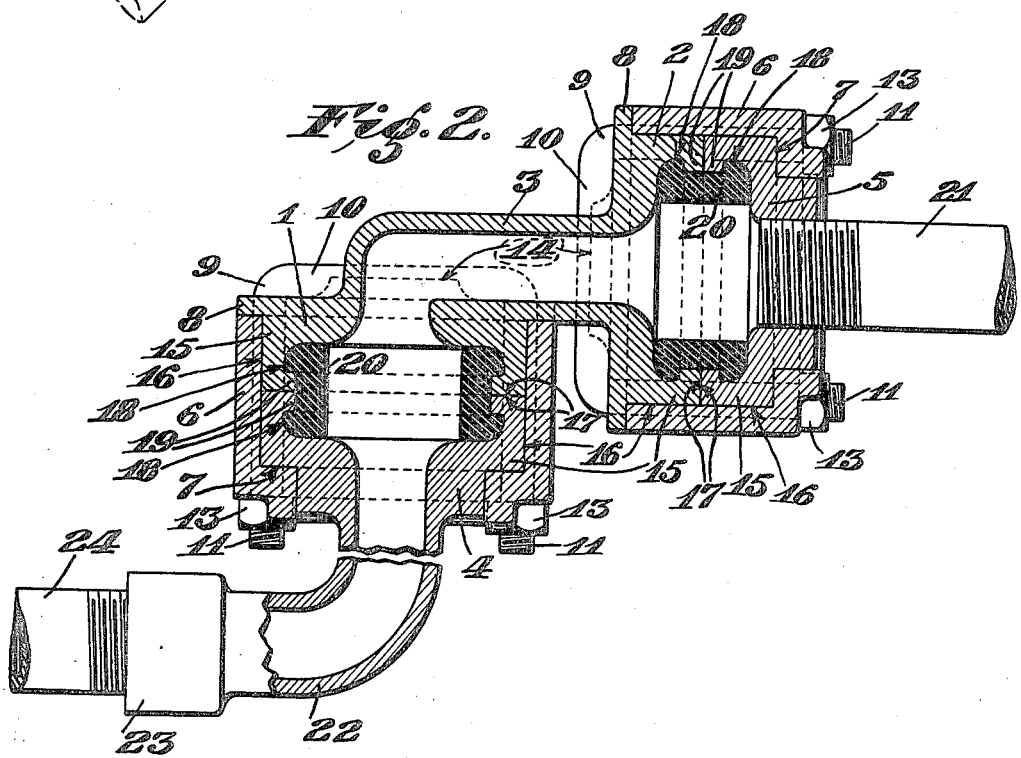
Inventor:
Votaw S. Durbin,
By Bruce S. Ferriss
his Atty.

UNITED STATES PATENT OFFICE.

VOTAW S. DURBIN, OF ST. LOUIS, MISSOURI.

SWIVEL-COUPLING FOR PIPE-LINES.

1,228,541.  Specification of Letters Patent.  Patented June 5, 1917.

Application filed June 17, 1916. Serial No. 104,165.

*To all whom it may concern:*

Be it known that I, VOTAW S. DURBIN, a citizen of the United States, residing in the city of St. Louis and State of Missouri, have invented new and useful Improvements in Swivel - Couplings for Pipe - Lines, of which the following is a specification.

This invention relates to couplings for pipes or pipe lines and the invention is expected to be particularly useful when employed in train service lines, for conducting compressed air or steam throughout the trains for applying the brakes or for heating purposes. The general object of the invention is to provide a coupling of very simple construction and of few parts which will operate effectively to prevent leakage of the fluid, such as steam or air at the coupling, and which will permit of a swiveling movement of the coupling. Such a swiveling movement is very desirable in train connections, on account of the constant change in the relative positions of the connected ends of the cars.

In furtherance of this general object the coupling may be constructed so as to permit a swiveling movement in two planes which are at an angle to each other which gives great freedom of movement of the coupling and enables it to adapt itself to the shifting positions of the hose or pipes at the coupling connections.

Further objects of the invention will appear hereinafter. In the drawing which illustrates a preferred embodiment of my invention, Figure 1 is a side elevation of the coupling, and Fig. 2 is a horizontal section taken on a line 2—2 of Fig. 1, certain parts being broken away and shown in elevation.

The coupling comprises two rigidly connected coupling heads 1 and 2, which are illustrated as integrally connected by a tubular neck 3. The coupling 2 has its longitudinal axis substantially coincident with the axis of the tubular neck 3, and the axis of the tubular head 1 is disposed at an angle to the axis of the coupling 2. The degree of this angle may depend upon circumstances, such as particular requirements of the coupling, but for the purposes stated the angle may be a right angle as illustrated.

Coöperating respectively with each of the heads 1 and 2, I provide swivel coupling heads 4 and 5. In this way two pairs of coöperating coupling heads are formed. In order to connect each coöperating pair of coupling heads so as to permit a swiveling movement and to produce a very light and easily assembled coupling, I provide each pair of coupling heads with a coupling sleeve 6. These coupling sleeves 6 are of substantially cylindrical form and constructed so as to form an annular shoulder 7 to engage the outer side of the swivel coupling head. The coöperating coupling head is formed near its rear side with a laterally projecting flange 8, the outer edge of which is substantially flush with the outer cylindrical face of the coupling sleeve. In order to hold this coupling sleeve in position I provide securing means consisting of two clips 9 for each pair of heads. These clips are in the form of U-bolts, arranged so that the transverse bar 10 of each U-bolt extends across the edge of one of the coupling heads 1 or 2, and so that the threaded extensions 11 of these bolts extend along the outer sides of the sleeves 6. The threaded ends of these extensions 11 pass through the lugs 12 on the sleeves and receive the nuts 13 which seat against the outer sides of the lugs. Evidently when the nuts 13 are tightened up the coöperating coupling heads will be drawn together. In order to assist in holding the U-bolts 9 in position, the outer edge of the relatively fixed coupling heads is provided with lugs 14 which engage the cross-bar 10 of the bolt and form a rudimentary seat for each bolt.

On account of the fact that the threaded ends of the U bolts are disposed remote from the connected heads 1 and 2, evidently the neck 3 cannot interfere with the application of a wrench to the nuts on the bolts. By reason of the fact that the lugs 12 are near the outer face of the coupling sleeves 6, it is evident that a very small amount of clearance is required for the cross-bars of the U bolts when the U bolts are being put in place, or are being removed.

The coöperating coupling heads have cylindrical walls 15 with outer cylindrical faces 16 which preferably are in alinement, that is, the coupling heads are preferably of equal diameter. Furthermore, the coupling heads are formed with flat end faces 17 which are in juxtaposition to each other, so that in the coupling, one of the coupling heads does not overlap the other, but the couplings are simply disposed with their end faces 17 abutting together or in juxtaposition; and hence, the cylindrical outer faces 16 of the coupling heads terminate at the end faces 17.

In order to prevent leakage at the coupling, I form the coöperating coupling heads with annular faces or grooves 18 which are under-cut into the cylindrical walls 15 in an outward radial direction. Hence the cylindrical walls will lie outward beyond these faces. With these faces in the form of grooves as illustrated, the effect is to produce inwardly extending annular projections 19; the projections 19 on two coöperating coupling heads lie adjacent to each other so that they may coöperate with the grooves 18 to form a seat for an internal washer or gasket 20. This washer is preferably in the form of an annular cushion of compressible material, such as soft rubber so that it will be readily expansible under pressure of a fluid to which its interior is exposed. This washer has a wall of substantial thickness so that it will maintain its shape within the coupling. Furthermore, the middle portion of the washer is of reduced external diameter so that it fits neatly against the face of the projections 19, and the ends of the washer are enlarged so as to form heads or outwardly projecting shoulders which seat in the grooves 18. When the washer is in place, when a fluid under pressure flows through the coupling, its pressure will be exerted upon the seat so as to prevent leakage. At the same time it will not hinder the free swiveling movement of the swivel head. I prefer to make the inner diameter of the washer considerably larger than the inner diameter of the tubular neck 3, so that a slight enlargement or chamber is formed within the washer, the effect of which is to insure that even when the fluid is flowing at a high velocity through the coupling, a certain amount of pressure will be developed on the interior of the washer to hold it firmly against its seat. But I do not provide any mechanical means for engaging the ends of the gasket to retain it, and the inner face of the gasket is unobstructed throughout its length. The pipe connection or pipe 21 is rigidly attached by a threaded connection with the swivel head 5 so that the axis of the pipe 21 is substantially coincident with the axis of the swivel head. This will permit of the rotation of the entire coupling about the axis of the pipe 21. The coupling 4, however, is provided with an elbow or neck 22 having a threaded end 23 for attaching a pipe 24, constructed so that the axis of the threaded end 23 lies in a plane parallel with the axis of the pipe 21. When the coupling is in use the swivel couplings 4 and 5 evidently can swivel freely, one permitting movement about the axis of the pipe 21, while the other permits a rotation about the axis of the coupling heads 1 and 4. The dotted lines in Fig. 1 indicate the manner in which the relative position of the pipe 24 may change when the coupling is in use.

In assembling the parts of the coupler, the washer 20 can be readily compressed at one end and forced into one of the coupling heads, and then its projecting portion can be similarly compressed and forced into the coöperating coupling head.

It is understood that the embodiment of the invention described herein is only one of the many embodiments the invention may take and I do not wish to be limited in the practice of my invention nor in my claims to the particular embodiment set forth.

I claim:

1. A pipe coupling for conducting a fluid under pressure, consisting of two connected coupling heads with their axes disposed at an angle to each other, swivel coupling heads coöperating, respectively, with said first-named coupling heads, each coöperating pair of said coupling heads having annular faces coöperating to form a washer-seat, said heads having cylindrical walls with end faces held in juxtaposition, said cylindrical walls lying outward beyond said annular faces and having outer cylindrical faces terminating at the end faces of said coupling heads, a sleeve engaging said cylindrical faces of each pair of coupling heads for connecting the same and permitting a swiveling movement of each coupling head upon its coöperating coupling head, a yieldingly expansible washer received on the seat of each coöperating pair of coupling heads extending across the juxtaposed end faces of said heads and having its inner face unobstructed and exposed to the pressure of the fluid, the pressure of the fluid operating to force said washer against its seat.

2. A pipe coupling for conducting a fluid under pressure, comprising coupling members having substantially cylindrical walls the end faces whereof are in juxtaposition, said coupling members having inwardly extending annular projections adjacent to said end faces, each coupling member further having an annular groove adjacent to its corresponding annular projection, said projections and said grooves coöperating to form a washer-seat surrounded by said cylindrical walls, an expansible annular washer extending across the plane of said end faces, having a middle portion of reduced diameter the outer face whereof seats against said inward projections, said washer having enlarged heads seating in said grooves, the inner face of said washer being exposed to the pressure of the fluid within the coupling, said coupling members having outer cylindrical faces terminating at said end faces, and a sleeve engaging said cylindrical faces for connecting said coupling members and permitting the same to swivel upon each other, the pressure of the fluid passing through said coupling operating to force said washer against said seat.

3. A coupling for conducting a fluid under pressure comprising two coupling heads and means for connecting the same to permit a swiveling movement of one head upon the other, said coupling heads having cylindrical walls with their end faces in juxtaposition, and having cylindrical outer faces terminating at said end faces, said coupling heads having annular grooves on the interior coöperating to form a washer seat, and an expansible annular washer having a middle portion of reduced diameter, extending across the plane of said end faces, said washer having ends of enlarged diameter seating in said grooves, the interior of said washer being exposed to the pressure of a fluid flowing through said coupling and forced against said seat by the pressure of the fluid.

4. A coupling for conducting a fluid under pressure, comprising two coupling heads, a washer connecting said coupling heads to prevent leakage of the fluid at said coupling, a sleeve surrounding said heads and permitting a swiveling movement of said heads with respect to each other, and securing means in the form of U bolts, each U bolt having a cross-bar engaging one of said coupling heads, and having threaded extensions projecting along the sides of said sleeves, and nuts on said threaded extensions for holding said sleeve in position.

5. A pipe coupling for conducting fluid under pressure, comprising coupling members having substantially cylindrical walls, the end faces whereof are in juxtaposition, said coupling members having inwardly extending annular projections, an expansible annular washer extending across the plane of said end faces, extending longitudinally beyond said annular projections and seating against the inner faces of said cylindrical walls, the inner face of said washer being exposed to the pressure of the fluid within the coupling, said coupling members having outer cylindrical faces terminating at said end faces, and a sleeve engaging said cylindrical faces for connecting said coupling members and permitting the same to swivel upon each other, the pressure of the fluid operating to force said washer against its seat.

6. A coupling consisting of a coupling member having two coupling heads with their axes disposed at an angle to each other, and having a tubular sleeve rigidly connecting said coupling heads, a swivel coupling head connected with each of said coupling heads to swivel thereupon, a coupling sleeve corresponding to each coupling head for holding its corresponding swivel coupling head in coöperation therewith, the end faces of the coupling heads and their corresponding swivel coupling heads being in juxtaposition, a yielding annular expansible washer corresponding to and disposed within each coupled head and swivel head, extending across the meeting plane of said end faces and seating within the coupled heads, a pair of U bolts corresponding to each coupling head, each U bolt having a cross-bar seating on its corresponding coupling head and having threaded extensions extending longitudinally of its corresponding sleeve, and nuts mounted on the threaded extensions of said U bolts, and seating on each sleeve.

7. A coupling consisting of a coupling member having two coupling heads with their axes disposed at an angle to each other, and having a tubular neck rigidly connecting said coupling heads, a swivel coupling head connected with each of said coupling heads to swivel thereupon, a coupling sleeve corresponding to each coupling head for holding its corresponding swivel coupling head in coöperation therewith, the end faces of the coupling heads and their corresponding swivel coupling heads being in juxtaposition, a yielding annular expansible washer corresponding to and disposed within each coupled head and swivel head, extending across the meeting plane of said end faces and seating within the coupled heads, a pair of U bolts corresponding to each coupling head, each U bolt having a cross-bar seating on its corresponding coupling head and having threaded extensions extending longitudinally of its corresponding sleeve, said sleeves having lugs near their outer faces receiving said threaded extensions, and nuts mounted on the threaded extensions of said U bolts, and seating on each sleeve.

In testimony whereof, I have hereunto set my hand.

VOTAW S. DURBIN.